July 20, 1965  R. C. BEACHAM  3,195,228
BAIL-APPLYING METHOD AND APPARATUS
Filed June 19, 1964  7 Sheets-Sheet 1

INVENTOR.
ROBERT C. BEACHAM
BY Eckhoff and Slick
ATTORNEYS

INVENTOR.
ROBERT C. BEACHAM
BY
ATTORNEYS

July 20, 1965

R. C. BEACHAM 3,195,228

BAIL-APPLYING METHOD AND APPARATUS

Filed June 19, 1964

INVENTOR
ROBERT C. BEACHAM
BY Eckhoff and Slick
ATTORNEYS

INVENTOR.
ROBERT C. BEACHAM
BY Eckhoff and Slick
ATTORNEYS

July 20, 1965 R. C. BEACHAM 3,195,228
BAIL-APPLYING METHOD AND APPARATUS
Filed June 19, 1964 7 Sheets-Sheet 7

INVENTOR.
ROBERT C. BEACHAM
BY Eckhoff and Slick
ATTORNEYS

United States Patent Office 3,195,228
Patented July 20, 1965

3,195,228
BAIL-APPLYING METHOD AND APPARATUS
Robert C. Beacham, El Cerrito, Calif., assignor to Cutter
Laboratories, Inc., a corporation of Delaware
Filed June 19, 1964, Ser. No. 376,448
8 Claims. (Cl. 29—430)

This application is a continuation-in-part of application Serial No. 322,763 filed November 12, 1963.

This invention relates in general to a method and apparatus for securing a wire carrying bail to a band and fixing the band about a cylindrical container. The bail is attached to the band in such a fashion that the bail cannot be removed in normal use.

A band, preferably of sheet metal and including a tongue portion at one end, the tongue being inserted through a hole provided at the other end of the band, may be used to provide an anchor attached to a bottle of parenteral solution or the like; this anchor serves to grip the terminal ends of a wire-carrying bail from which the bottle may be suspended. The band has a pair of spaced holes therethorugh for receipt of the wire. The terminal ends of the bail are often bent in opposite directions and at more or less right angles to the wire bail proper, as in the case of the bails used on paint cans or, in the alternative, the terminal ends may both be bent in the same direction, in which case somewhat greater care must be taken that they do not inadvertently pull free of the band to which they are anchored.

Assembly of the aforementioned units has always been a manual operation and, further, conventional assembly methods did not always assure that the carrying bails or handles would remain in place during use. Assembly methods therefore have been sought which assured greater reproduceability of results insofar as security of the bails and bands is concerned. Also, preformed bails, when handled en mass, tend to interlock with one another. Separating them is often difficult and slows assembly procedures.

It is therefore an object of this invention to provide a method for fabricating and assembling sheet metal bands which serve as anchors for bottles of parenteral solution or the like and wire-carrying bails from which the bottles of solution may be suspended.

It is a further object of this invention to provide a novel unit including a bottle of parenteral solution or the like, a band, and a carrying bail which may be assembled automatically but which, once assembled, may not be disassembled without forcing and distorting the band or wire to a substantial degree.

A further object of this invention is to provide a method for converting a straight, narrow strip into a band for a bottle of parenteral solution with a minimum of separate manipulations and while the band is moving more or less continuously toward the bottle to which it is to be applied.

Still another object of this invention is to provide a method for attaching a wire-carrying bail with ease to a more or less preformed band and thereafter adjusting the position of the carrying bail relative to the band so that, following assembly of the entire combination including the bottle, the bail may not become disassembled.

Another object of this invention is to provide an assembly method which assures that the band and bail will not become disassembled but which permits the terminal ends of the bail to be bent in the same direction whereby to permit automatic assembly.

A final object of this invention is to provide a method for assembling carrying bails and containers without the usual difficulties attendant on handling a mass of bails.

Further objects and advantages of this invention, if not specifically set forth, will become apparent during the course of the description which follows.

Generally, this invention comprises a method and apparatus whereby a wire-carrying bail, said bail having terminal wire ends extending at about right angles to the remaining portions of the bail and both in the same direction, is attached to a band intended to be secured about a container, said wire band having a pair of spaced holes for receipt of said terminal ends of the carrying bail. The method comprises developing relative motion between the more or less preformed (generally cylindrical) band, which lies in a plane containing the line of travel, and the wire bail, which lies in a plane extending transversely of the first plane and normal to the line of travel, the terminal ends of the wire being pointed toward the aforementioned holes in the band, the holes being particularly accessible by virtue of the fact that the band material on the leading side of each hole is depressed relative to that on the other side so as to facilitate entry of the terminal wire ends into the holes. The consequence is that the holes are directed at the oncoming wire terminal ends. The method also involves inserting the terminal wire ends in the holes, rotating the bail about the points of contact of the bail and the band until the bail and said band are approximately in the same plane, and placing the said band about said container. The container is of such a height and the location of the band thereabout is such that the bail may not thereafter be returned to the position relative to said band which it occupied when the bail was first contacted by the band.

A further important aspect of the invention is the provision of a method for forming wire carrying bails and immediately thereafter, without further movement or handling, securing them to containers or bands in turn to be secured to containers. At no time is a group of bails on hand to become entangled or otherwise to slow the assembly operation.

In the drawings:

FIGURE 1 is a schematic plan view showing the apparatus and method of this invention, while

FIGURE 6 is a side elevation of an assembled unit including a bottle, bail and band showing the fashion in which the bail may be rotated after the band is secured about a bottle.

FIGURE 7 is a fragmentary plan view on a larger scale than FIGURE 1 showing the assembly of the bails, sheet metal bands and bottles, while FIGURE 7A is a side elevation corresponding to FIGURE 7.

Figure 1:
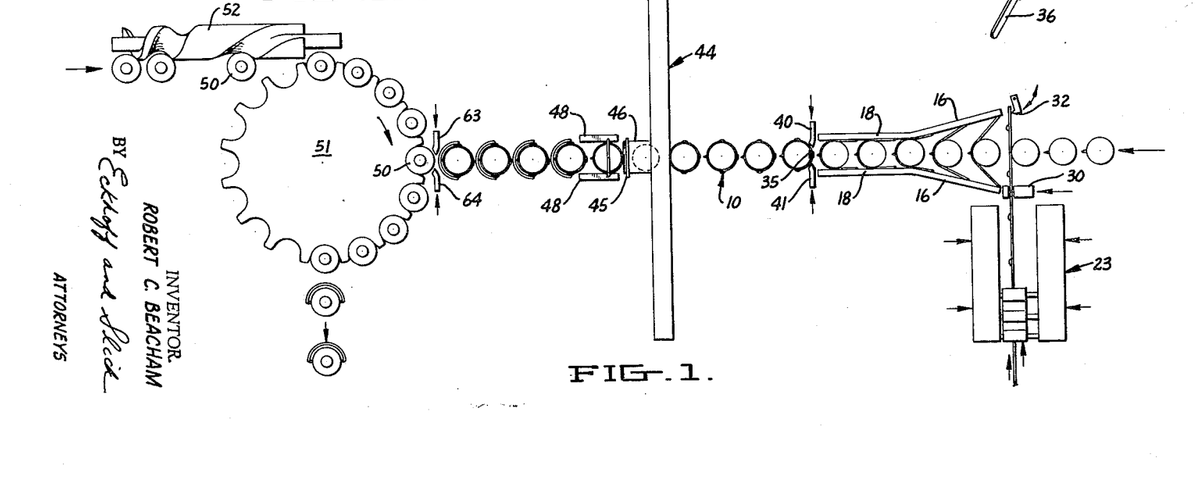
Figures 6, 7, 7A:
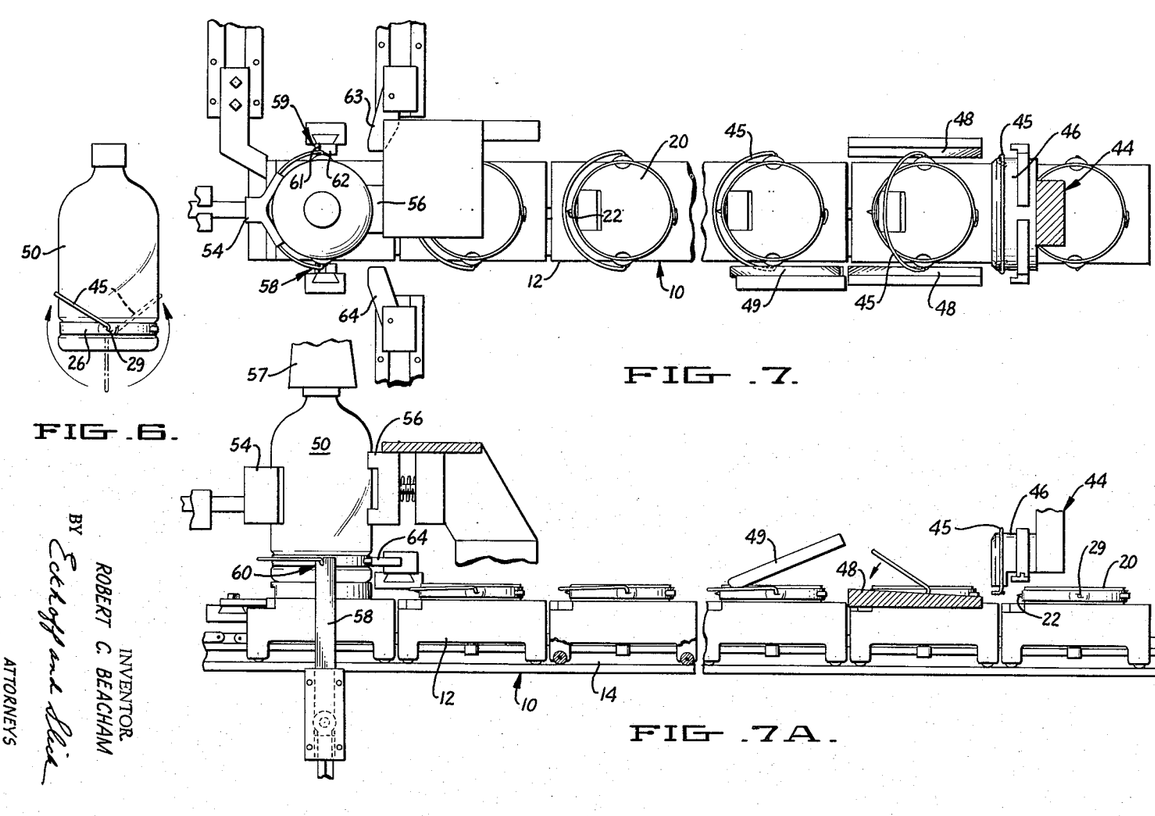
Figure 12:
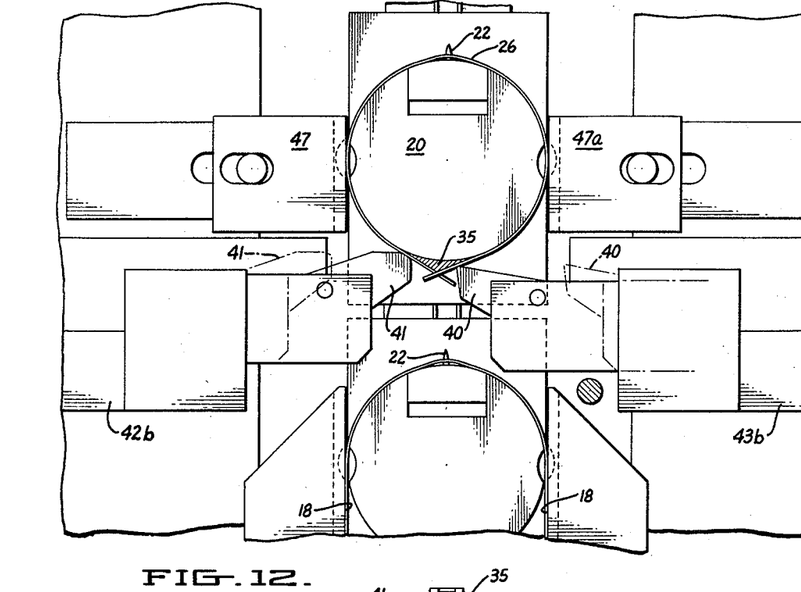
FIGURE 12 is a fragmentary plan view showing the manner in which the bands are loosely crimped about conveyor-mounted supporting platforms.
Figure 13:
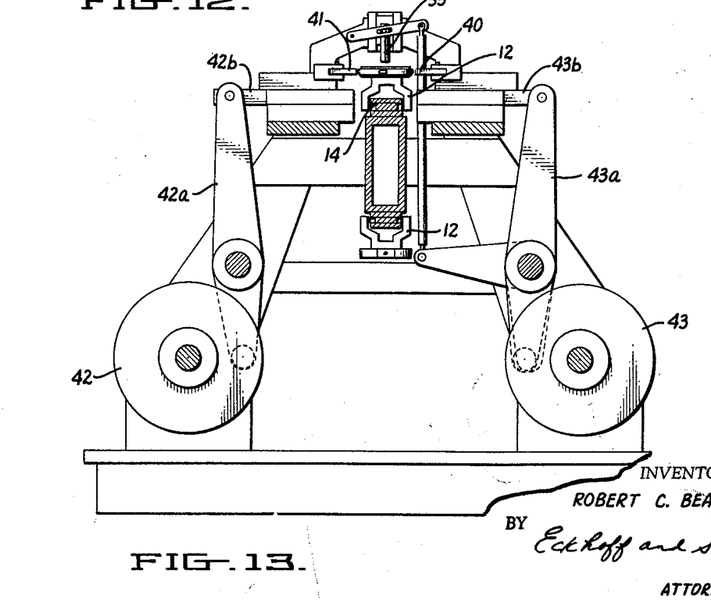
FIGURE 13 is a fragmentary, enlarged end elevation through the line 13—13 of FIGURE 8 also showing the crimping of the bands about the supporting platforms or forms.

Referring now to the drawings wherein like characters refer to like parts throughout, there may be seen, especially in FIGURES 1, 7 and 7A, an endless conveyor, generally 10, incorporating a plurality of wheeled carriages 12 joined together in single file. These move along on the track or support 14. As shown in FIGURES 1 and 12, the conveyor advances between a pair of walls having converging sections 16 and relatively narrow parallel sections 18. The location of the converging walls 16 must be such that, as seen in FIGURES 1 and 1A, the band material will be progressively wrapped about the leading face of the forms 20 as the carriages 12 advance.

Figure 8:
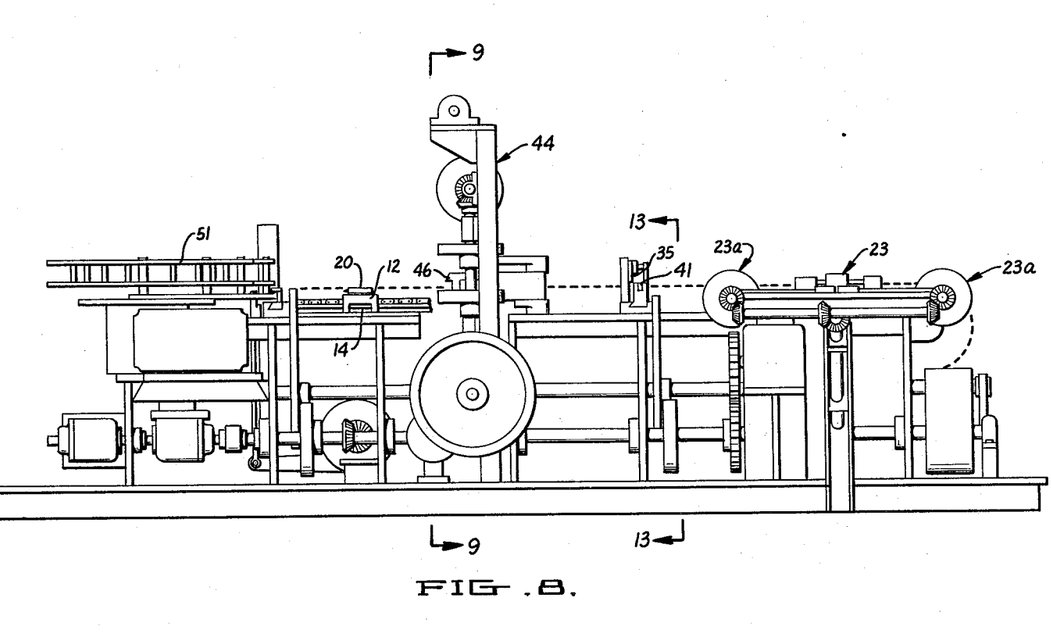
FIGURE 8 is a side elevation of the machine of this invention.

On each carriage 12 is mounted a flat-topped assembly form or mandrel 20 having a retractable centering pin 22 at the lead edge thereof. The assembly form is preferably cylindrical but could be elliptical, rectangular, etc. Each pin 22 is intended to register with a hole 24 in a strip of band material 26 preferably of sheet metal which is fed by the flying dies, generally 23, various cams and gears for which are also shown in FIGURE 8 (23a). The flying dies form the hole 24 and the domed sections 28 having holes 29 seen from the underside at the right of FIGURE 1A. Cooperating and synchronized with the dies 23 is the stationary die 30 and the band-gripping dog 32 having a pin which registers with the hole 34 also formed by the stationary die 30. The stationary die also forms the tongue 36 which, as seen in the successive representations of FIGURE 1, interconnects with the hole 34 to hold the band in a closed position. The function of the dog 32 is to hold the band material 26 in place as the flying dies 23 move away from the assembly forms 20.

In the alternative, the band 26 may be performed and simply fed to a point where they are in the path of the advancing assembly forms 20. The forming and feeding operation for the bands 26 does not represent a facet of this invention.

At the terminal ends of the parallel walls 18, a pair of opposed tools 40 and 41 (shown in two positions in FIGURE 12) are arranged to fold the trailing ends of the bands about the cylindrical mandrels and then thread tongues 36 through holes 34. Tool 35 mounted above the path of travel of the conveyor 10 reciprocates vertically so that during a portion of its path of travel it lies immediately adjacent one of the assembly forms 20 and prevents the band material 26 from being wrapped tightly about the form by the action of the tools 40 and 41. This permits the band to be removed readily at a later time. Tool 41 first moves inwardly against the band wrapped about the assembly form and holds it in place so that that portion of the band having the tongue 36 extends outwardly. Tool 40 then moves inwardly contacting the band and guiding the hole 34 over the tongue 36. The tool 40 continues to move inwardly loosely crimping the tongue 36 back over the band material immediately surrounding one side of hole 34 in the fashion seen in the third of the progressive views of FIGURE 1A. Both tools thereafter retract and the assembly form indexes forward one position. Holding elements 47 and 47a simultaneously grip and hold in place the band material as tools 40 and 41 act upon the trailing ends. These tools are driven by a system of cams 42 and 43 which control the motion of levers 42a and 43a, respectively in turn connected to slides 42b and 43b.

A modified four-slide machine 44 (see FIGURES 8 and 9) may be used to form the wire bails 45. The forming action takes place on the semi-cylindrical fixed die member or king post 46. Where the wire bails are of the proper configuration and formed directly on the king post 46, substantial economies are achieved over preforming the wire bails in the conventional fashion and thereafter assembling them. Because of the hooks on the ends of the wires, bails are notoriously subject to becoming entangled with one another and handling them manually or by machine becomes extremely difficult. Where they are formed immediately prior to being joined with a container or band, as here, handling is much simplified. The operation of the four-slide machine, which will be set forth in greater detail below, is such that elbows are formed in the wire and the terminal ends directed 90° relative to the remaining portions of the bail on the king post with these terminal ends pointing toward the oncoming holes 29 in the domed sections 28 of bands 26. King post 46 has a portion thereof 46a whose function is to crease the wire, thereby controlling the distance between the terminal ends 68 of the wire-carrying bail.

Figure 1A:
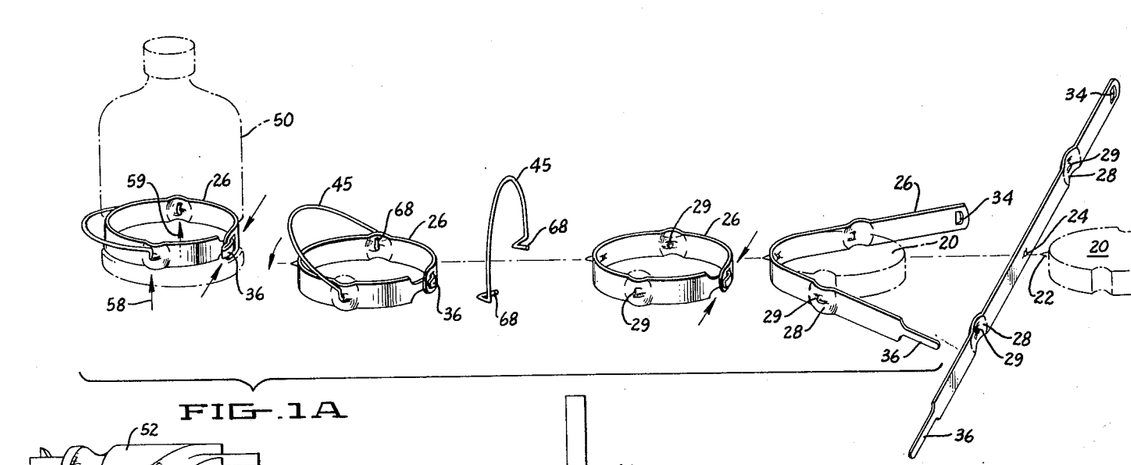
FIGURE 1A is a perspective view illustrating the relationship of the elements being acted upon at various stages.
Figures 2, 2A:
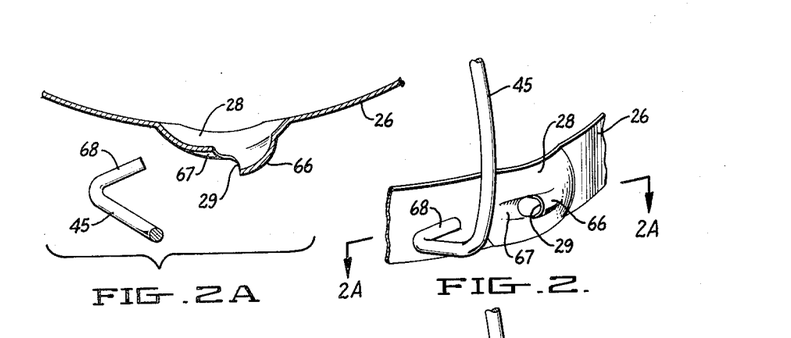
FIGURES 2, 3, 4, and 5 are fragmentary views showing the sequence of steps involved in the assembly of the bails and sheet metal bands, while the corresponding
FIGURES 2A, 3A, 4A and 5A are fragmentary sectional views through the various section lines seen in FIGURES 2-5.

Fixed along the path of travel of the forms 20 are the inclined stationary cams 48. These are spaced sufficiently far from the cylindrical bands that they will strike those portions of each bail farthest removed from one another and because of the direction of movement of the conveyor 10 will necessarily cause a counter-clockwise rotation of each bail, as seen in FIGURES 1A and 7A. Downwardly angled fixed plate 49, seen especially in FIGURES 7 and 7A, insures that the bails all rotate backwardly a predetermined distance until the bails and bands lie in the same plane. At the final conveyor station, the forms 20 reach a point at which bottles 50, each having a suitable groove or bead adjacent the base thereof, are fed into place by means of turret 51 which is, in turn, supplied bottles by screw conveyor 52. Continuous feed is thus transformed into intermittent feed so that the bottles may be moved down to the flat tops of the forms 20, as seen at the far left-hand side of FIGURES 7 and 7A.

The bottles are moved into final position by the coaction of a spring-loaded Y-shaped clamp 54 and spring-loaded rail 56. Each bottle 50 is placed somewhat to the right, as seen in FIGURES 7 and 7A, of a precisely centered position. Specifically, this is done by placing the bottle upon the pallet and permitting spring-loaded Y-shaped clamp 54 to force the bottle against rail 56. The rail is equipped with a stop, not shown, to fix its maximum travel and clamp 54 then pushes the bottle and rail 56 backwardly, or to the right as seen in FIGURE 7A. Here the bottle is in a position where its far right-hand vertical edge overhangs the pallet about ¼". The front clamp 54 is locked and, as noted, rail 56 can retract no farther so that a solid system is formed which grips the bottle firmly. As a further stability-creating measure, spring-loaded clamp 57 thereafter moves down from above and applies about 25 pounds pressure to the top of the bottle.

The elevators 58 and 59 contact the combined sheet metal strap and ball sub-assembly and lift it over the bottom of each of the bottles 50. Because of the fact that the bottle is not centered upon the pallet, one portion of the band, the leading edge, will slip over the bottom first. The lifting mechanism permits the necessary tilting action. Elevator 58 has a V-notch 60 which grasps the wire while the elevator 59 has a horizontal lifter portion 61 and a shoulder 62. The elements thus are capable of capturing the wire 45 on one side thereof, by grasping it within the V-structure 60 while the other side of the wire is lifted but not captured, allowing for the tilting action of the band 26. The bail and band may thus be moved when it is desired to tighten the band about the bottle and the band may "float" itself into position as it is lifted over the bottom of the bottle. The V-shaped notch actually grips the bails at points where the wire emerges from holes 29. Each bottle has a groove or region of lessened cross section or a bead adjacent the bottom so as to prevent the band from slipping free after it has been passed thereover and has been tightened somewhat. The cooperating tools 63 and 64 pull the band tightly about the bottle which, in this area, is of a lesser diameter than the form 20 from which it has lately been removed. Thereafter, the tools 63 and 64 fold the tongue 36 over a second time so that the free end of the tongue is covered, as seen in the far left-hand portion of FIGURE 1A. Finally, clamps 54 and 57 retract and the spring-loaded rail 56 as shown in FIGURE 7A pushes the bottle in the direction of conveyor travel, permitting the bottle to clear the tools 63 and 64 and to properly be grasped by one of the pockets of the turret 51. As the spring action of the rail 56 pushes the bottle tightly into a pocket of the turrent, all of the tooling and clamps withdraw.

FIGURES 2–5 and the corresponding sectional views show the fashion in which the preformed wire carrying bails are interconnected with the bands and swung in a counter-clockwise direction (in the apparatus arrangement shown here) so as to lock them in place. To permit this locking action, it is essential that the radius of the bail be less than the length of that portion of the container extending above the point of attachment of the band. Note FIGURE 6 which indicates the extent to which each bail 45 is permitted to rotate about the holes 29 in a band once the band been secured about a bottle 50. If the bail were to be removed from the band, it would be necessary for the bail to reassume the position in which it was when it rested upon the king post 46 and, as seen in FIGURE 6, this is not possible with the bottle 50 in place.

Referring now to FIGURES 2–5, each dome 28 formed by the co-action of the dies 23 has holes 29 suitably sized for receipt of the terminal ends of the wire bails. On one side of each hole there is a raised area 66 and an opposed depressed area 67 which causes the hole to be more or less directed at an advancing terminal end 68 of the wire-carrying bail 45. At this point, the bail and the band lie in perpendicular planes.

Figures 3, 3A, 4, 4A, 5, 5A:
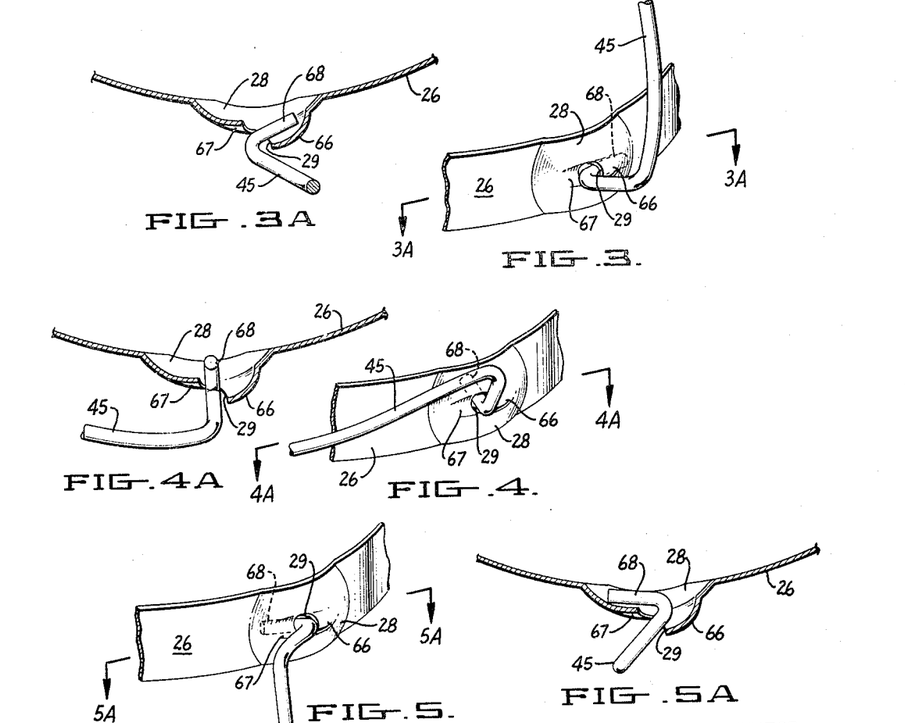

In the corresponding FIGURES 3 and 3A, a leading wire end has been inserted in the corresponding hole 29 of dome 28 and the wire bail is ready to be removed from the semi-cylindrical die or king post 46. In FIGURES 4 and 4A the bail has been rotated in such a manner that the terminal ends, now hidden within the dome 28, are at right angles to the horizontal internal channel formed by the bulges 66. As soon as the elevators 58 have raised the sub-assembly into place about a bottle, it will be appreciated that the bail can no longer be pivoted to a position such that the terminal wire ends can return to the "just assembled" position (see FIGURE 6). When the bail is swung to the positions seen in FIGURES 5 and 5A, as when a bottle of parenteral solution is hung up for use, the bulge 66 rests against an adjacent elbow of the wire, as particularly seen in FIGURE 5A, thus locking it securely in place and eliminating any possibility of the wire releasing the sheet metal band and bottle.

It will be appreciated that it is only where the bail is to be secured to a relatively narrow band, rather than a relatively tall can having bosses at the side thereof, that this assembly sequence is possible. If one attempted to secure wire bails of the type described here directly into bosses of the same general structure shown herein but formed in the sides of, for example, a paint can, the wire 45 would not be able to attain the position seen in FIGURE 5 relative to the can. Means must be provided, as here, for ultimately locking the wire bail out of the position it assumed relative to the bosses or domes 28 at the time of assembly; and this is possible only where the container corresponding to the bottle 50 is inserted after the sub-assembly of the sheet metal band and bail have been completed.

Figure 9:
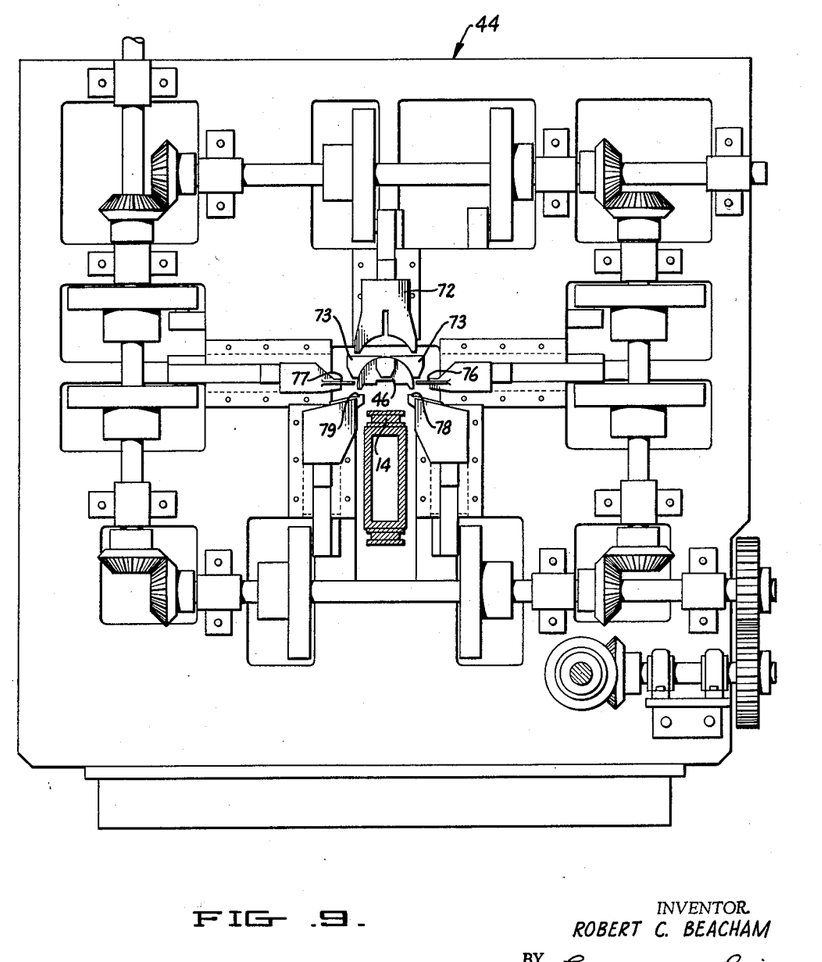
FIGURE 9 is an end elevation of the four-slide mechanism used for forming or shaping the wire bails.
Figure 10:
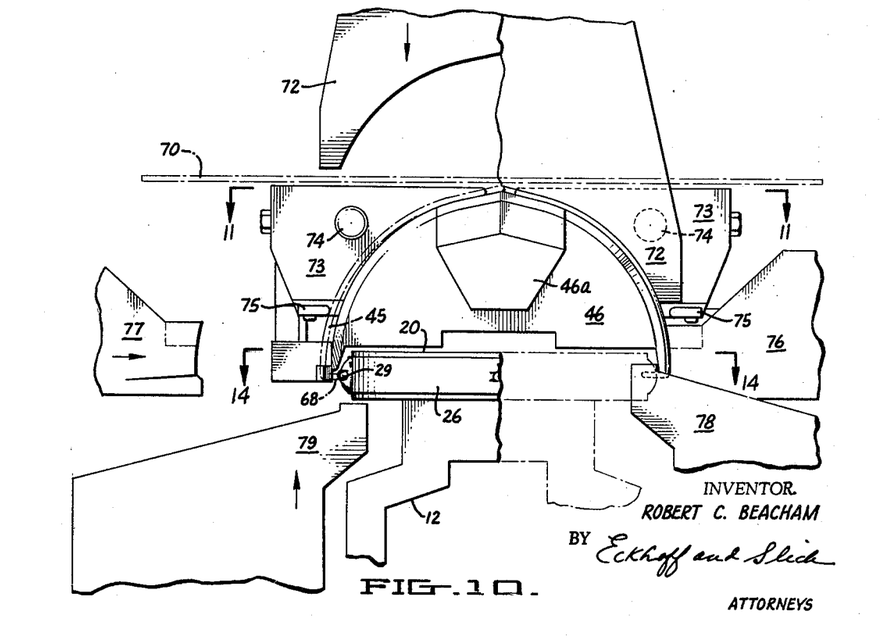
FIGURES 10 and 11 are respectively an enlarged end elevation and a plan view along the line 11—11 of FIGURE 10 showing in greater detail the mechanism used to shape the wire bails.
Figure 11:
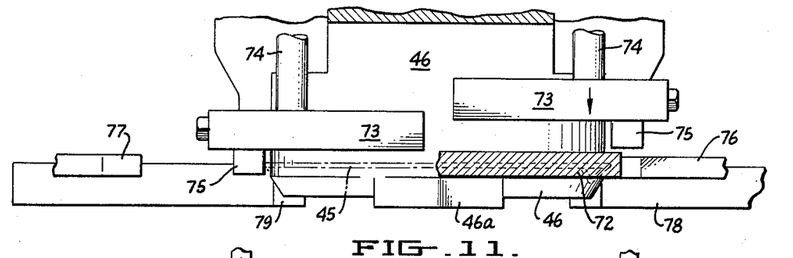

As pointed out earlier, a modified four-slide machine, a group of co-acting dies, is used to bend the wire used for bail purposes into the proper configuration, as seen especially in FIGURE 10. The wire 70 is wed to a position immediately above the king post 46 where it is cut into the proper length segments. In FIGURES 10 and 11 various of the tools are shown (in different positions at the left and right side of the drawings). At the left, tool 72 appears in its raised position assumed before it contacts the wire. On the right side in FIGURES 10 and 11 the tool 72 is shown in a lowered position where a length of straight wire 70 has already been bent to form a bail 45. Tool 72, as seen in its retracted position at the left of FIGURE 10, moves downwardly over the length of wire (see FIGURE 9 as well) and bends the wire to conform to the shape of the king post 46. Strippers 73, supported by rods 74 and having keeper elements 75 on the leading faces thereof, advance in the direction of conveyor movement to overlay the lowermost ends of the wire 45. Tool 72 thereafter is lifted and the wire retained in place by the action of the aforementioned keepers 75.

Figure 14:
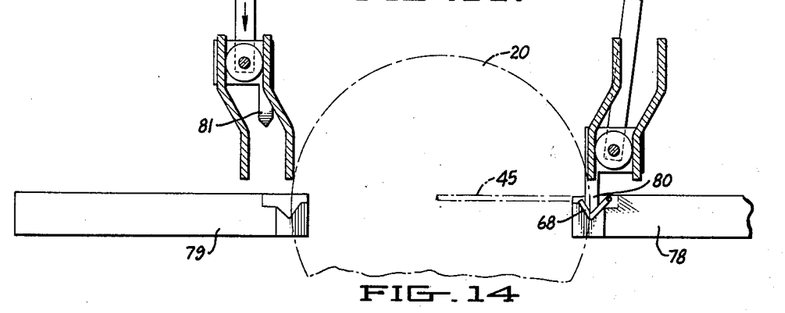
FIGURE 14 is a fragmentary sectional view through line 14—14 of FIGURE 10.

Tools 76 and 77, operating simultaneously, but shown in progressive views in FIGURES 10 and 11, move inwardly from either side, striking the ends of the wire, which ends depend beneath the supporting king post 46. The action of the tools 76 and 77 is to bend the wire inwardly in the direction at right angles to the motion of the conveyor 10. Thereafter, lowermost tools 78 and 79, as seen in FIGURES 9, 10 and 14, move upwardly to force the free ends 68 of the wires into a horizontal orientation. As seen in FIGURE 14, each of the tools 78 and 79 has a generally V-shaped face directed toward the oncoming assembly form. After tools 78 and 79 have assumed the aforementioned position, tools 80 and 81, moving in the direction of the advancement of the conveyor, force the ends 68 of the wire to conform to the shape of the concave portions of tools 78 and 79 whereby to provide the hook-like elements directed generally toward the holes 29 in the domes 28 of the band 26. As seen in FIGURE 9, each of the tools 72, 73, 76, 77, 78, 79, 80 and 81 is controlled by a cam, most of which appear in FIGURE 9 keyed to a shaft and in turn driven by gearing. The last action taken at the four-slide machine station is the stripping action of tools 73 which are further moved in the direction of conveyor movement to strip the bail 45 from the king post 46. At the same time, the wire ends 68 are inserted into the holes 29, as especially seen in FIGURES 3 and 3A. The general four-slide machine structure is well known and need not be described in great detail here.

In operation, strips of suitable width (generally sheet metal) to serve as bands are supplied from a reel. The flying dies 23 which form all necessary holes, concave sections, etc. also feed the sheet metal material into the proper loading position for the oncoming assembly form 20 through the fixed cut-off die 30 by pulling the band material off the supply reel. The linear oscillating motion and the opening and closing motion of the dies 23 achieves this feed action without need for the usual power-driven rollers or other conventional feed means. The stationary die 30 forms the tongue 36 and forms hole 34 in the lead end of the strip immediately following, as well as removing all excess metal. A pin 22 is inserted into a hole 24 in one of the strips as the conveyor indexes forward. Further forward progress wraps the strip about the form, as seen in FIGURE 1. The preliminary crimping of the tongues 36 is completed by means of tools 35, 40 and 41 and the carriage 12 moves on to the point where the wire bail 45 is formed by the four-slide machine and simultaneously positioned in the path of an oncoming bail. Terminal ends 68 of the wire bails are passed into the holes 29 as the assembly forms move forward. Each bail is forced into a horizontal orientation by the action of cams 48 and plate 49 as the assembly form moves to the next station. A bottle 50 is placed upon the upper surface of the form, the elevators 58 and 59 move the sub-assembly over any bead or relatively enlarged portion near the base of the bottle and into place. Preferably, the band 36 is slipped over the base of the container one side (as the trailing side) first. To permit this, each bottle is positioned slightly forward of assembly form 20 upon which it is placed. Finally, the tools 62 and 64 complete the crimping and tightening operation by folding over tongue 36 as shown at the far left-hand corner of FIGURE 1A.

Obviously, many modifications and variations of this invention may be made without departing from the spirit and scope of this invention, and therefore only such limitations should be imposed as are indicated in the appended claims.

I claim:

1. In a method wherein a wire carrying bail, said bail having terminal wire ends extending at about right angles to the remaining portions of said bail and both in the same direction, is attached to a flexible band intended to be secured about a container, said band having a pair of spaced holes therein for receipt of said terminal ends of said carrying bail, and wherein portions of each band are raised on one side of each hole relative to the band material on the opposite side thereof to form a channel lying in the same plane as the said band whereby to facilitate entry of the said terminal ends into said holes as said wire terminal ends are moved tangentially of said band, the improvements comprising:

(a) developing relative motion between the said band and the said bail while the said band lies in a first plane containing the line of travel and the said bail lies in a second plane normal to the line of travel and extending transversely of said first plane, said terminal ends being aligned with said holes in said band and with the said channels in the band thereof;

(b) inserting said terminal ends in said holes;

(c) rotating said bail 90° about said holes; and (d) placing said band about said container, said container having its largest portion extending into the area occupied by the said bail at the time of attachment of the said bail to the said band, said container being of such a height that the said bail may not thereafter be returned to the position relative of said band which it occupied when said bail first contacted said band.

2. A method of forming an assembly consisting of a container, a flexible band secured thereabout, and a bail attached to said band comprising:

(a) wrapping about a form of the same shape as the ultimate band shape desired a strip of flexible band material containing perforations therein for receipt of wire ends, said form being of a cross section in excess of the cross section of said container;

(b) securing the terminal ends of the said strip together to form a band;

(c) attaching the said bail to the said band;

(d) removing the said band from the said form and advancing it over one end of the said container to encircle the container; and (e) thereafter tightening and further securing the terminal ends of the said band together whereby to grip the said container tightly.

3. The method of claim 2 wherein the container is a cylindrical glass bottle having an integral groove immediately adjacent the bottom thereof whereby to form an area for the receipt of said band of a diameter less than the diameter of the bottom of the said bottle.

4. A method for assembling a narrow strip of band material having a tongue at one end thereof and a slot for said tongue at the other end thereof, a wire carrying bail, and a container into a unit capable of being supported by the said carrying bail comprising:

(a) forming a pair of spaced holes in a length of said band material and a third hole intermediate the said holes;

(b) positioning the said strip in the path of an advancing assembly form having a pin on the leading edge thereof, said pin being positioned to register with the said third hole in the said strip;

(c) engaging said strip with said assembly form and moving the said form between converging wall elements whereby to bend the said strip about the sides of the said form;

(d) folding the trailing ends of the said generally U-shaped strip so formed toward one another and interlocking the said tongue and the said hole adjacent one end of the said strip whereby to form a closed band about the said assembly form;

(e) inserting each opposed terminal end of a wire carrying bail in one of the said holes of the said pair;

(f) rotating said bail at least about 90° about the said holes;

(g) retracting said pin of said form to release said band and removing the said band from the said form and passing the said band over an end of a container, said container end being of lesser diameter than the said form; and (h) thereafter tightening the said band on the said container and securing the opposite ends of the said band together.

5. A method for assembling a narrow strip of band material, a wire carrying bail, and a container into a unit capable of being supported by the said carrying bail comprising:

(a) forming a pair of spaced holes in a length of band material;

(b) positioning said strip in the path of an advancing assembly form;

(c) engaging said strip with said assembly form and wrapping the said strip about the sides of said form;

(d) forming lengths of wire into carrying bails at a station positioned along the path of travel of said advancing assembly form, said carrying bails being formed with the opposed terminal ends thereof positioned to register with the holes in the said band material as the said assembly form advances carrying the said band material thereon;

(e) moving the said assembly form toward the said wire carrying bail so formed; and (f) inserting the opposed terminal ends of said wire carrying bail in the said holes immediately after the said wire carrying bail has been formed.

6. Apparatus for forming an assembly consisting of a container, a thin band intermediate the ends thereof, and a wire bail for suspending said container, said bail being secured to the said band, comprising:

(a) a single file conveyor;

(b) a plurality of spaced cylindrical forms carried by the said conveyor;

(c) means for feeding narrow strips of band material to a position between forms as the said conveyor advances;

(d) means for wrapping the said strips of band material about the said forms and securing opposite ends of the said strips together to form bands;

(e) means positioned along the path of travel of said conveyor for holding a preformed wire carrying bail in the path of travel of each of the said bands so formed; and (f) means for removing the said bands from the said forms and for sliding each of the said bands over one end of a container positioned immediately thereabove on the said cylindrical form.

7. The structure of claim 6 wherein each form is provided with a pin on the lead surface thereof for registry with a corresponding hole in a strip and wherein a pair of converging walls positioned one on either side of the path of travel of the said conveyor serves to partially wrap the said strips about the said form.

8. An apparatus for forming an assembly consisting of a container and a wire carrying bail secured to the sides thereof comprising:

(a) a single file conveyor;

(b) means for securing thereto in spaced relationship a plurality of cylindrical elements each having holes at opposite sides thereof;

(c) means positioned along the path of travel of the said conveyor for forming wire bails with the terminal ends of the said bails directed toward the said holes when the said conveyor advances the said cylindrical elements toward the said wire bails; and (d) means for removing from the said conveyor the said cylindrical elements having the bails secured thereto.

References Cited by the Examiner

UNITED STATES PATENTS

| | | | |
|---|---|---|---|
| 1,575,037 | 3/26 | Chalmers et al. | |
| 1,875,110 | 8/32 | Myers | 29—208 |
| 2,623,274 | 12/52 | Henchert | 29—211 |
| 2,711,574 | 6/55 | Conklin et al. | 29—430 X |

WHITMORE A. WILTZ, *Primary Examiner.*